United States Patent
Cochien et al.

(10) Patent No.: US 9,790,613 B2
(45) Date of Patent: Oct. 17, 2017

(54) ALUMINUM ALLOY ANODIZATION

(71) Applicant: GOODRICH CORPORATION, Charlotte, NC (US)

(72) Inventors: Ellie L. Cochien, Mississauga (CA); Khalid Hussain, Oakville (CA); Edward Benedict Evans, Toronto (CA)

(73) Assignee: GOODRICH CORPORATION, Charlotte, NC (US)

(*) Notice: Subject to any disclaimer, the term of this patent is extended or adjusted under 35 U.S.C. 154(b) by 331 days.

(21) Appl. No.: 14/660,116

(22) Filed: Mar. 17, 2015

(65) Prior Publication Data
US 2016/0273122 A1 Sep. 22, 2016

(51) Int. Cl.
C25D 11/18 (2006.01)
C25D 11/08 (2006.01)
B64C 25/00 (2006.01)
C25D 11/16 (2006.01)
C25D 11/24 (2006.01)

(52) U.S. Cl.
CPC .............. *C25D 11/08* (2013.01); *B64C 25/00* (2013.01); *C25D 11/16* (2013.01); *C25D 11/246* (2013.01)

(58) Field of Classification Search
CPC .......... C25D 11/08; C25D 11/16; C25D 11/18
USPC ........................................................ 205/203
See application file for complete search history.

(56) References Cited

U.S. PATENT DOCUMENTS 3,798,137 A * 3/1974 Kampert ................ C25D 11/22
                                                              205/159
5,374,347 A * 12/1994 Pearlstein ............... C23C 22/34
                                                              148/267
2004/0050709 A1* 3/2004 Cadwell Stancin ... C25D 11/08
                                                              205/213
2012/0313423 A1   12/2012 Brown et al.
2015/0020925 A1    1/2015 Bares et al.

FOREIGN PATENT DOCUMENTS

JP     3212754      9/2001
WO     2013117759   8/2013
WO     2014167087   10/2014

OTHER PUBLICATIONS

Immarigeon et al.,"Lightweight Materials for Aircraft Applications," Materials Characterization (no month, 1995), vol. 35, pp. 41-67.*
Extended European Search Report dated Jul. 20, 2016 in European Application No. 16160908.6.

* cited by examiner

Primary Examiner — Edna Wong
(74) Attorney, Agent, or Firm — Snell & Wilmer L.L.P.

(57) ABSTRACT

The present disclosure describes methods for anodizing aluminum alloys, including 7000 series aluminum alloys, and creating metal components, including aircraft landing gear components, from the aluminum alloys.

17 Claims, 4 Drawing Sheets

ALUMINUM ALLOY ANODIZATION

FIELD

The present disclosure relates generally to anodization of aluminum alloys and, more specifically, to anodizing aluminum alloys without using hexavalent chromium.

BACKGROUND

Aircraft landing gear components are frequently made of aluminum alloys that are anodized to increase corrosion resistance. However, typical anodization protocols, such as MIL-A-8625 (military specification, approved by the Department of Defense), utilize hazardous hexavalent chromium compounds. Such compounds are increasingly controlled and/or banned for use in the production of aircraft components.

SUMMARY

A method for coating an aluminum alloy in accordance with various embodiments may comprise deoxidizing the aluminum alloy using a non-hexavalent chrome deoxidizing agent to create a deoxidized aluminum alloy, anodizing the deoxidized aluminum alloy by subjecting the deoxidized aluminum alloy to an electrolytic process comprising passing between about 15 V and about 16 V through a sulphuric acid to create an anodized aluminum alloy having an anodized layer having a coating weight of less than about 10 $g/m^2$, and sealing the anodized aluminum alloy with a trivalent chromium solution to create a sealed anodized aluminum alloy. The method may further comprise cleaning the aluminum alloy with an alkaline cleaner prior to the step of deoxidizing the aluminum alloy. The method may further comprise rinsing the sealed anodized aluminum alloy. The aluminum alloy may be a 7000 series aluminum alloy, such as 7075, 7050, 7175, or 7085 aluminum. Further, the anodized layer may have a coating weight of between about 6 $g/m^2$ and 9 $g/m^2$. The electrolytic process may comprise passing a voltage of between about 15 V and about 16 V through sulphuric acid.

A method for processing an aluminum alloy into an aluminum alloy component comprising deoxidizing the aluminum alloy component using a non-hexavalent chrome deoxidizing agent to create a deoxidized aluminum alloy component, anodizing the deoxidized aluminum alloy component by subjecting the deoxidized aluminum alloy component to an electrolytic process comprising passing a voltage of between about 15 V and about 16 V through a sulphuric acid to create an anodized aluminum alloy component having an anodized layer having a coating weight of less than about 10 $g/m^2$, and sealing the anodized aluminum alloy component with a trivalent chromium solution to create a sealed anodized aluminum alloy component. The method may further comprise cleaning the aluminum alloy component with an alkaline cleaner prior to the step of deoxidizing the aluminum alloy component. Forming the aluminum alloy component may comprise casting or forging a landing gear component such as, for example, shock strut, a first torque link, or a second torque link. The aluminum alloy component may comprise a 7000 series aluminum alloy, such as 7075, 7050, 7175, or 7085 aluminum. The anodized layer may comprise a coating weight of between about 6 $g/m^2$ and 9 $g/m^2$.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step.

Figure 1:
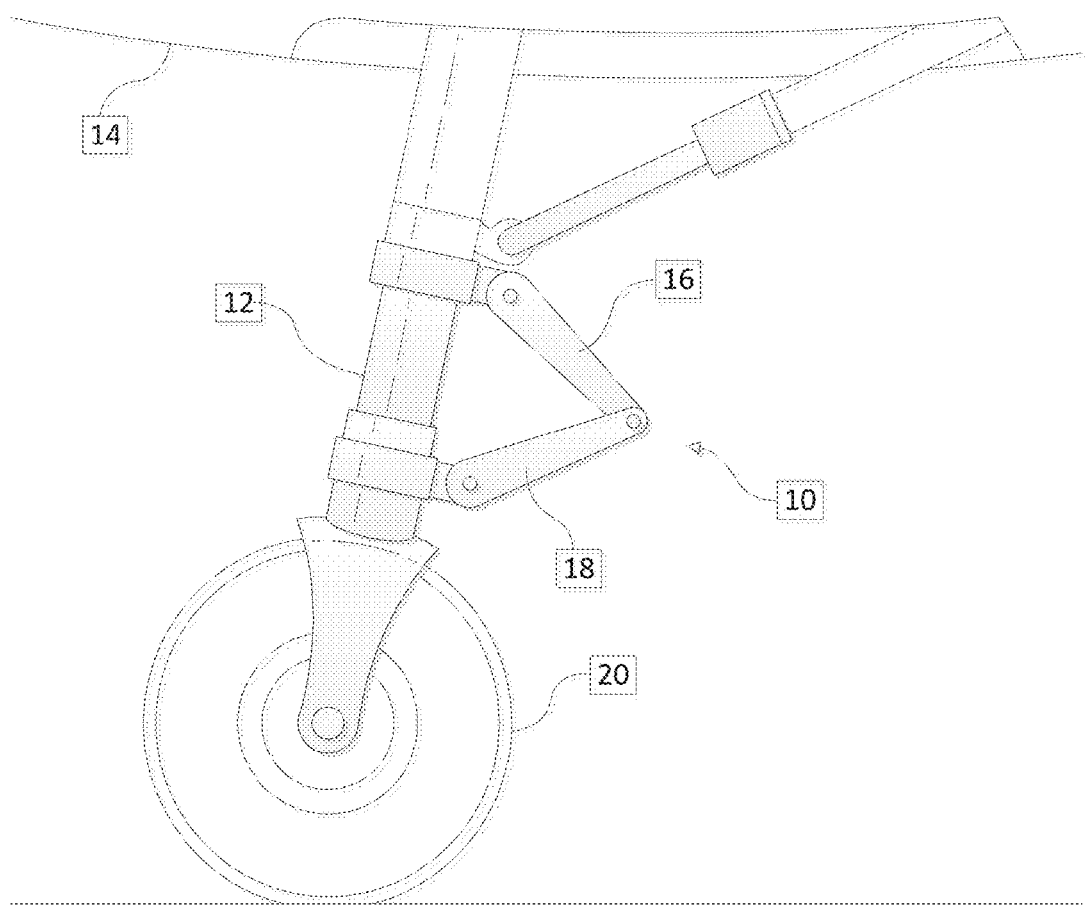
FIG. 1 illustrates a side view of a landing gear assembly in accordance with various embodiments.

With initial reference to FIG. 1, a landing gear assembly 10 of an aircraft 14 in accordance with various embodiments is illustrated. In various embodiments, landing gear assembly 10 comprises a shock strut 12. Landing gear assembly 10 may further comprise a wheel 20 coupled to shock strut 12. In various embodiments, landing gear assembly 10 comprises a first torque link 16 and a second torque link 18 coupled to shock strut 12. Further, first torque link 16 may be coupled to second torque link 18. Although described with specific reference to particular components, landing gear assembly 10 is illustrated as an example of an aircraft landing gear assembly, and the present disclosure is not limited to landing gear assembly 10 of FIG. 1.

Figure 2:
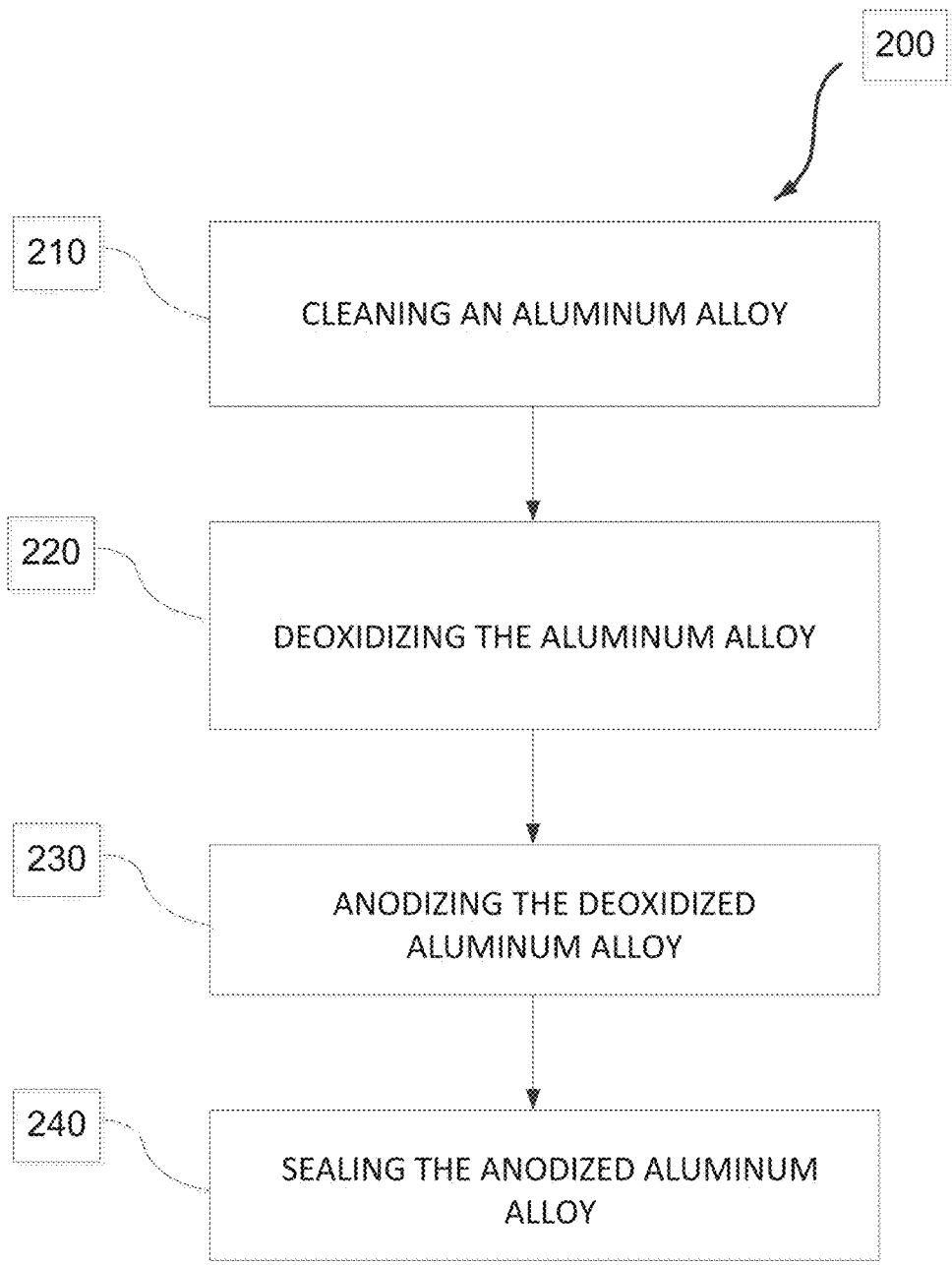
FIG. 2 illustrates a method of anodizing an aluminum alloy in accordance with various embodiments.

With reference to FIG. 2, a method 200 for anodizing an aluminum alloy in accordance with various embodiments is illustrated. In various embodiments, an aluminum alloy suitable for anodizing by method 200 comprises a 7000 series aluminum alloy. A 7000 series aluminum alloy such as, for example, 7075 aluminum (SAE standard AMS4124, among others), 7050 aluminum (SAE standard AMS4107, among others), 7085 aluminum (SAE standard AMS4329, among others), or 7175 aluminum (SAE standard AMS4148, among others), may be anodized using method 200. However, other aluminum alloys, including alloys in the 2000 and 6000 series (for example, UNS A92024 and AMS4117, respectively), may also be anodized using method 200.

Method 200 may comprise a step 210 of cleaning an aluminum alloy. For example, an aluminum alloy may be cleaned using an alkaline cleaner to prepare it for further anodizing steps. The aluminum alloy may be rinsed, soaked, and or scrubbed with the cleaning solution. However, any manner of cleaning with any suitable cleaning solution may be used to prepare the aluminum alloy for further anodizing steps.

In various embodiments, method 200 further comprises a step 220 of deoxidizing an aluminum alloy. In conventional processes, a hexavalent chromium-containing deoxidizing solution is used to process the aluminum alloy, resulting in a deoxidized aluminum alloy. In contrast, step 220 may utilize a non-hexavalent chromium-containing deoxidizing agent to deoxidize the aluminum alloy, resulting in a deoxidized aluminum alloy. For example, a trivalent chromium-containing deoxidizing solution may be used in step 220 to process the aluminum alloy.

Method 200 may further comprise a step 230 of anodizing the deoxidized aluminum alloy. In various embodiments, step 230 comprises subjecting the deoxidized aluminum alloy to an electrolytic process. For example, the deoxidized aluminum alloy may be submerged in a solution of sulphuric acid and electrolytically plated by passing voltage through the solution. The voltage supplied to the anodization process may, for example, be between about 15 V and 16 V.

Figure 3:
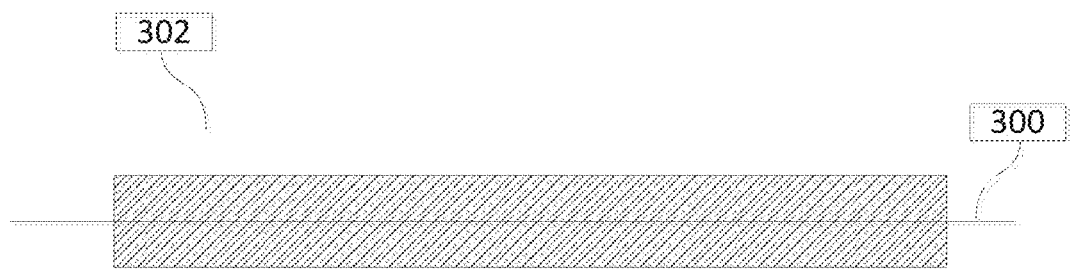
FIG. 3 illustrates a partial cross sectional view of an anodized aluminum alloy in accordance with various embodiments.

With initial reference to FIG. 3, step 230 may produce an anodized layer 302 on the surface of an aluminum alloy 300. For example, anodized layer 302 may comprise a coating weight per area of less than 10 $g/m^2$, and further, between about 6 $g/m^2$ and 9 $g/m^2$.

In various embodiments, method 200 further comprises a step 240 of sealing the anodized aluminum alloy to create a sealed aluminum alloy. For example, the anodized aluminum alloy may be submerged in a bath of a sealing solution, which may improve corrosion resistance by depositing sealing solution in pores of the surface of the anodized aluminum alloy. In various embodiments, the sealing solution comprises a trivalent chromium solution. However, any suitable, non-hexavalent chromium sealing solution is within the scope of the present disclosure.

Figure 4:
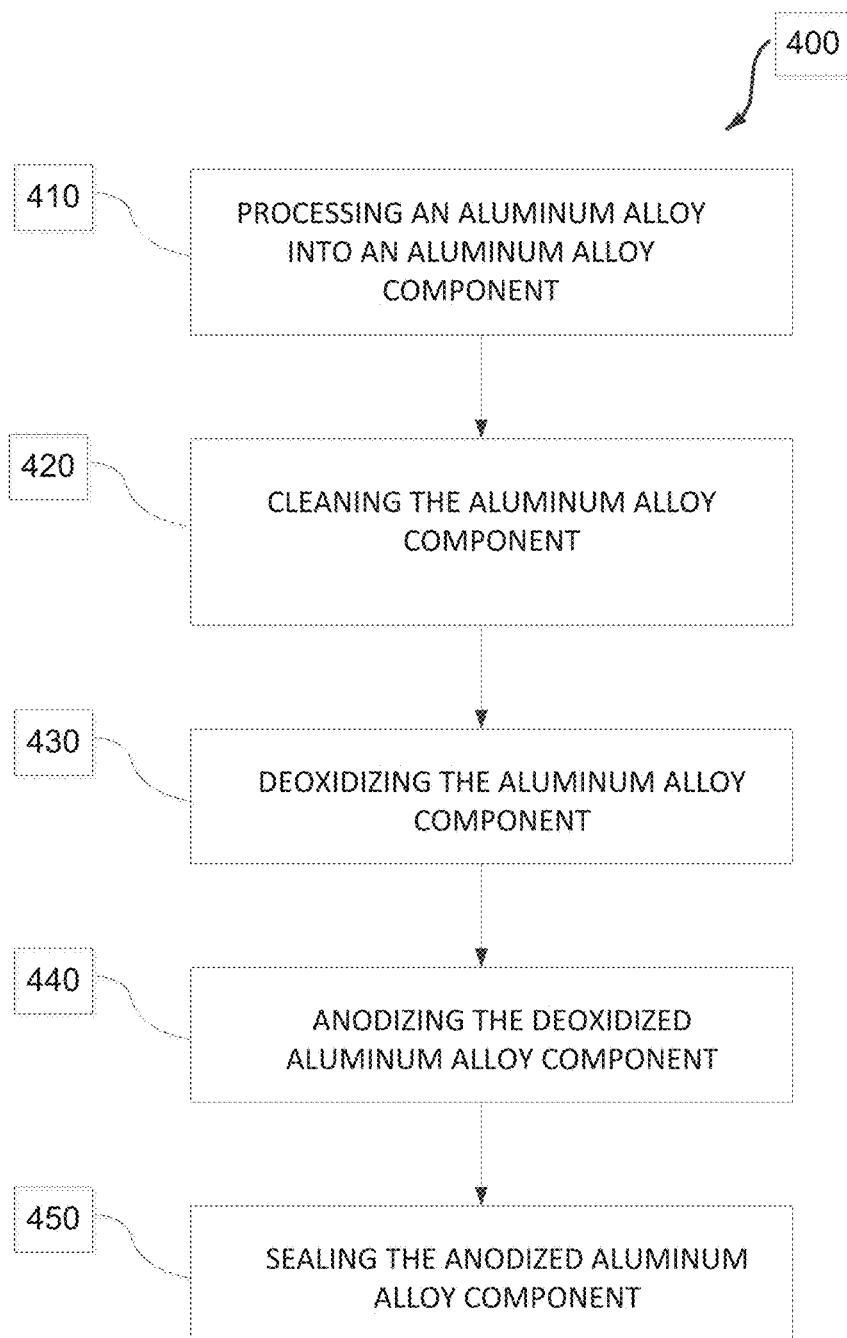
FIG. 4 illustrates a method of processing a landing gear component from an aluminum alloy in accordance with various embodiments.

With reference to FIG. 4, a method 400 of processing an aluminum alloy is illustrated. Method 400 may comprise, for example, a step 410 of processing an aluminum alloy into an aluminum alloy component. With momentary reference back to FIG. 1, the aluminum alloy component may comprise, for example, a component of landing gear assembly 10. In various embodiments, the aluminum alloy component may comprise one of a first torque link, and a second torque link, or any other component of landing gear assembly 10. Step 410 may comprise, for example, casting, forging, machining, or any other technique for processing an aluminum alloy into an aluminum alloy component.

Similarly to step 210 of method 200, step 410 may comprise utilizing an aluminum alloy such as a 7000 series aluminum alloy. In various embodiments, a 7000 series aluminum alloy such as, for example, 7075 aluminum (SAE standard AMS4044M, among others), may be used to process an aluminum alloy into an aluminum alloy component using method 400. However, other aluminum alloys, including alloys in the 2000 and 6000 series, may also be suitable for use in method 400 as well.

Method 400 may comprise a step 420 of cleaning the aluminum alloy component. For example, an aluminum alloy component, such as the component formed in step 410, may be cleaned using an alkaline cleaner to prepare it for further anodizing steps. However, any suitable cleaning solution may be used to prepare the aluminum metal component for further anodizing steps.

In various embodiments, method 400 further comprises a step 430 of deoxidizing an aluminum alloy component, resulting in a deoxidized aluminum alloy component. Typically, a hexavalent chromium-containing deoxidizing solution is used to deoxidize the aluminum alloy component. In contrast, step 430 may utilize a non-hexavalent chrome deoxidizing agent to deoxidize the meta, resulting in the deoxidized aluminum alloy component. For example, a trivalent chromium-containing deoxidizing solution may be used in step 430 to process the aluminum alloy component.

Method 400 may further comprise a step 440 of anodizing the deoxidized aluminum alloy component. In various embodiments, step 440 comprises subjecting the deoxidized aluminum alloy component to an electrolytic process using an acid, such as sulphuric acid, to create an anodized aluminum alloy component. For example, the deoxidized aluminum alloy component may be electrolytically plated by passing voltage through a solution of sulphuric acid. The voltage supplied to the anodization process may, for example, be between about 15 V and 16 V. A layer of anodization comprising a coating weight of less than 10 $g/m^2$, and further, between about 6 $g/m^2$ and 9 $g/m^2$ may be deposited on the deoxidized aluminum alloy component.

In various embodiments, method 400 further comprises a step 450 of sealing the anodized aluminum alloy metal component to create a sealed aluminum alloy component. For example, the anodized aluminum alloy component may be submerged in a bath of a sealing solution, which may improve corrosion resistance by depositing sealing solution in pores of the surface of the anodized aluminum alloy component. In various embodiments, the sealing solution comprises a trivalent chromium solution. However, any suitable, non-hexavalent chromium sealing solution is within the scope of the present disclosure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of coating an aluminum alloy comprising:
deoxidizing the aluminum alloy using a chrome deoxidizing agent that is non-hexavalent to create a deoxidized aluminum alloy;
after deoxidizing the aluminum alloy to create the deoxidized aluminum alloy, anodizing the deoxidized aluminum alloy by subjecting the deoxidized aluminum alloy to an electrolytic process comprising passing a voltage between about 15 V and about 16 V through a sulphuric acid to create an anodized aluminum alloy having an anodized layer having a coating weight of less than 10 g/m$^2$; and
after anodizing the deoxidized aluminum alloy to create the anodized aluminum alloy, sealing the anodized aluminum alloy with a trivalent chromium solution to create a sealed anodized aluminum alloy.

2. The method of claim 1, further comprising cleaning the aluminum alloy with an alkaline cleaner prior to the step of deoxidizing the aluminum alloy.

3. The method of claim 1, wherein the coating weight of the anodized layer is between about 6 g/m$^2$ and 9 g/m$^2$.

4. The method of claim 1, wherein the aluminum alloy comprises a 7000 series aluminum alloy.

5. The method of claim 4, wherein the aluminum alloy comprises one of 7075, 7050, 7085, and 7175 aluminum.

6. The method of claim 1, wherein the sealed anodized aluminum alloy comprises a portion of an aircraft landing gear component.

7. The method of claim 6, wherein the aircraft landing gear component comprises one of a first torque link and a second torque link.

8. The method of claim 1, wherein the chrome deoxidizing agent is a trivalent chromium-containing solution.

9. A method comprising:
processing an aluminum alloy to form an aluminum alloy component;
deoxidizing the aluminum alloy component using a chrome deoxidizing agent that is non-hexavalent to create a deoxidized aluminum alloy component;
after deoxidizing the aluminum alloy component to create the deoxidized aluminum alloy component, anodizing the deoxidized aluminum alloy component by subjecting the deoxidized aluminum alloy component to an electrolytic process comprising passing a voltage of between about 15 V and about 16 V through a sulphuric acid to create an anodized aluminum alloy component having an anodized layer having a coating weight of less than about 10 g/m$^2$; and
after anodizing the deoxidized aluminum alloy component to create the anodized aluminum alloy component, sealing the anodized aluminum alloy component with a chromium sealing solution that is non-hexavalent to create a sealed anodized aluminum alloy component.

10. The method of claim 9, further comprising cleaning the aluminum alloy component with an alkaline cleaner prior to the step of deoxidizing the aluminum alloy component.

11. The method of claim 10, wherein the aluminum alloy component comprises one of a first torque link and a second torque link.

12. The method of claim 9, wherein processing the aluminum alloy component comprises casting, machining, or forging a landing gear component.

13. The method of claim 9, wherein the aluminum alloy component comprises a 7000 series aluminum alloy.

14. The method of claim 13, wherein the aluminum alloy component comprises one of 7075, 7050, 7175, and 7085 aluminum.

15. The method of claim 9, wherein the coating weight of the anodized layer is between about 6 g/m$^2$ and 9 g/m$^2$.

16. The method of claim 9, wherein the chromium sealing solution comprises a trivalent chromium solution.

17. The method of claim 9, wherein the chrome deoxidizing agent is a trivalent chromium-containing solution.

* * * * *